US012040554B2

(12) United States Patent
Ota et al.

(10) Patent No.: US 12,040,554 B2
(45) Date of Patent: Jul. 16, 2024

(54) WIRELESS COMMUNICATION DEVICE AND WIRELESS COMMUNICATION METHOD

(71) Applicant: NIPPON TELEGRAPH AND TELEPHONE CORPORATION, Tokyo (JP)

(72) Inventors: Atsushi Ota, Musashino (JP); Naoki Kita, Musashino (JP); Yushi Shirato, Musashino (JP); Kazuto Goto, Musashino (JP); Kota Ito, Musashino (JP); Chunhsiang Huang, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 893 days.

(21) Appl. No.: 17/043,264

(22) PCT Filed: Mar. 19, 2019

(86) PCT No.: PCT/JP2019/011343
§ 371 (c)(1),
(2) Date: Sep. 29, 2020

(87) PCT Pub. No.: WO2019/188548
PCT Pub. Date: Oct. 3, 2019

(65) Prior Publication Data
US 2021/0050668 A1    Feb. 18, 2021

(30) Foreign Application Priority Data

Mar. 29, 2018  (JP) .................... 2018-065958

(51) Int. Cl.
*H01Q 3/36*   (2006.01)
*H01Q 21/06*  (2006.01)
(Continued)

(52) U.S. Cl.
CPC ............. *H01Q 3/36* (2013.01); *H01Q 21/061* (2013.01); *H04B 7/0417* (2013.01); *H04B 7/043* (2013.01)

(58) Field of Classification Search
CPC ........ H01Q 3/36; H01Q 21/061; H01Q 1/246; H04B 7/0417; H04B 7/043; H04B 7/0617; H04B 7/086
See application file for complete search history.

(56) References Cited

U.S. PATENT DOCUMENTS

| 5,977,910 A | * | 11/1999 | Matthews | ............... H01Q 25/00 |
| | | | | 342/368 |
| 2018/0302175 A1 | * | 10/2018 | Yuan | ..................... H01Q 21/00 |
| 2018/0366815 A1 | * | 12/2018 | Rheinfelder | ......... H01Q 3/2605 |

FOREIGN PATENT DOCUMENTS

| JP | S5864806 A | 4/1983 |
| JP | 2001326541 A | 11/2001 |
| JP | 2013219742 A | 10/2013 |

OTHER PUBLICATIONS

Toru Takahashi, "Array Antenna", Knowledge Base Knowledge Forest, 2013, pp. 8-10. <http://www.ieice-hbkb.org/files/04/04gun_02hen_07.pdf>. Machine translation attached.

* cited by examiner

*Primary Examiner* — Hoang V Nguyen
*Assistant Examiner* — Yonchan J Kim
(74) *Attorney, Agent, or Firm* — Harness, Dickey & Pierce, P.L.C.

(57) ABSTRACT

A wireless communication device is presented. The wireless communication device includes: a high-frequency circuit; and an analog signal processing circuit that performs gain adjustment such that a gain for each of the plurality of antenna elements, in case of a signal transmission or in case of a signal reception, is a predetermined value being depen- (Continued)

dent on a position of the antenna element. The analog signal processing circuit includes a first splitter/combiner between the high-frequency circuit and the plurality of antenna elements. For each antenna element in the plurality of antenna elements, a second splitter/combiner is coupled to a particular antenna element in the plurality of antenna elements and, for each antenna element in the plurality of antenna elements, two or more phase shifters of a given M system are connected in parallel with each other and coupled between the first splitter/combiner and a corresponding second splitter/combiner.

2 Claims, 8 Drawing Sheets

(51) Int. Cl.
*H04B 7/0417* (2017.01)
*H04B 7/0426* (2017.01)

WIRELESS COMMUNICATION DEVICE AND WIRELESS COMMUNICATION METHOD

CROSS-REFERENCE TO RELATED APPLICATIONS

This application is a 371 U.S. National Phase of International Application No. PCT/JP2019/011343, filed on Mar. 19, 2019, which claims priority to Japanese Application No. 2018-065958 filed on Mar. 29, 2018. The entire disclosures of the above applications are incorporated herein by reference.

TECHNICAL FIELD

The present invention relates to a wireless communication device and a wireless communication method.

BACKGROUND ART

In recent years, frequency resources in a microwave band with high convenience have been depleted with explosive spread of smartphones. As countermeasures, transition from third generation mobile phones to fourth generation mobile phones and allocation of new frequency bands have been carried out. However, frequency resources allocatable to service providers are limited because a large number of service providers desire to provide services.

In mobile phone services, improvement in spectral efficiency by a multi-antenna system that uses a plurality of antenna elements has been examined. According to the Institute of Electrical and Electronics Engineers, Inc. (IEEE) 802.11n, which is a wireless standard specification that has come to be widely adopted, spatial multiplexing transmission is performed using Multiple Input Multiple Output (MIMO) transmission technologies by using a plurality of antenna elements for both transmission and reception. With this spatial multiplexing transmission according to IEEE 802.11n, transmission capacity is thus enhanced, and spectral efficiency is improved.

Note that "MIMO" typically represents a system provided with a plurality of antenna elements both on a transmission station side and on a reception station side. On the other hand, a system provided with a plurality of antenna elements on a transmission station side and provided with a single antenna element on a reception station side is typically called "Multiple Input Single Output (MISO)" instead of "MIMO". However, in the following description, systems, including the system provided with a plurality of antenna elements on the transmission station side and provided with a single antenna element on the reception station side, are also referred to as "MIMO".

Also, a scheme in which division into a plurality of frequency components (subcarriers) is performed and signal processing is carried out on a frequency axis is typically employed among recent communication schemes. Examples of such a scheme include an Orthogonal Frequency Division Multiplexing (OFDM) modulation scheme, a Single Carrier-Frequency Domain Equalization (SC-FDE) scheme, and the like. In the following description, OFDM, SC-FDE, and the like will not particularly be distinguished, and these schemes in which division into a plurality of frequency components (subcarriers) is performed and signal processing is carried out on the frequency axis will collectively be referred to as "subcarriers".

Further, a Massive MIMO (a large scale MIMO) technology has attracted attention in recent years, and this Massive MIMO technology includes 100 or more antenna elements and allows signals that are transmitted and received via the antenna elements to be multiplied by a predetermined coefficient and then combined, thereby achieving a high directional gain and high-order spatial multiplexing. As directivity control technologies using such multiple element antennas, technologies by using a phased array antenna are known. A phased array antenna, in a case in which a line-of-sight wave is regarded as a plane wave, improves a directional gain by adjusting differences between amounts of rotation of complex phases due to a path length difference of each antenna element and then combining them in the same phase.

In general, high-order spatial multiplexing is expected to be performed in Massive MIMO in addition to securing of the directional gain. In a case in which digital signal processing is performed on all signals of antennas of a super-large number of elements by using an Analog to Digital (A/D) converter and a Digital to Analog (D/A) converter, computation amounts are enormous. It is thus necessary to provide a greater number of devices, which leads to an increase in cost and a further increase in power consumption of the devices.

In order to avoid increases in cost and power consumption related to devices as described above, two-stage signal processing has attracted attention. The two-stage signal processing described herein is signal processing in which, as analog signal processing in the first stage, directivity forming processing to some extent is carried out through analog processing, and after the number of signals is narrowed down, computation processing of signal separation through weight multiplication is performed on the limited number of digital signals as digital signal processing in the second stage.

In the aforementioned digital signal processing in the second stage, for example, in a case in which signal sequences of N systems are spatially multiplexed, transmission is performed by N virtual transmission antennas obtained through directivity forming on a transmission side and reception is performed by N virtual reception antennas obtained through directivity forming on a reception side as well, as a result, the same processing as the processing in a case in which communication is equivalently performed by using N×N MIMO channels is performed.

At this time, in a case in which main lobes of a plurality of formed directional beams do not overlap, if side lobe levels are reduced, absolute values of non-diagonal elements of a matrix of N×N MIMO channels are set to be relatively small as compared with absolute values of diagonal elements. In this manner, orthogonality of signals of N systems increase, and satisfactory communication characteristics are exhibited. On the other hand, if a side lobe level is high, non-negligible interference remains, and it is essential to efficiently perform the aforementioned signal processing in the second stage.

Here, as a technology for reducing the side lobe level, a technology of applying a variation in accordance with Taylor distribution or Chebyshev distribution to an amplitude of each antenna element of an array antenna is known (NPL 1, for example).

CITATION LIST

Non Patent Literature

NPL 1: Toru Takahashi, "Knowledge Base, Knowledge Forest" Group 4-Chapter 2-Section 7 "Array Antenna", The Institute of Electronics, Information and Communication Engineers, pp. 8 to 10, 2013

SUMMARY OF THE INVENTION

Technical Problem

Conventionally, it is assumed that the aforementioned low side lobe technologies of the related art include digital signal processing that can adjust an amplitude as well. This is because the phase shifter that performs analog signal processing performs only rotation of complex phases and cannot adjust the amplitude. However, because it is essential to mount an A/D converter and a D/A converter for each antenna element in order to perform digital signal processing as described above, there are problems in terms of cost and power consumption. Thus, a technology that enables amplitude adjustment for each antenna element, in addition to phase rotation for each element, in order to direct an appropriate beam in a desired direction through analog signal processing is required.

The present invention was made in view of the aforementioned circumstances, and an object thereof is to provide a wireless communication device and a wireless communication method capable of achieving a low side lobe through analog signal processing.

Means for Solving the Problem

According to an aspect of the present invention, there is provided a wireless communication device that is a base station device or a terminal station device in a wireless communication system, the wireless communication system including the base station device having a plurality of antenna elements and a plurality of the terminal station devices, and allowing the base station device and the terminal station device to communicate with each other, the wireless communication device including: a high-frequency circuit configured to perform signal processing including frequency conversion between a signal in a radio frequency band and a signal in a baseband band or an intermediate frequency band; and an analog signal processing circuit configured to perform gain adjustment through analog signal processing by using a phase shifter or an attenuator such that a gain for each of the plurality of antenna elements, in case of a signal transmission or in case of a signal reception, is a predetermined value being dependent on a position of the antenna element, wherein the analog signal processing circuit includes a first splitter/combiner configured to establish 1-to-(N×M) connection by performing splitting or combining between the high-frequency circuit and the plurality of antenna elements for an integer N of 2 or more corresponding to the number of antenna elements and an integer M of 1 or more, and at least one phase shifter connected between the first splitter/combiner and each of the plurality of antenna elements.

Also, in the aspect of the present invention, in the aforementioned wireless communication device, the analog signal processing circuit further includes at least one fixed attenuator connected between the first splitter/combiner and at least one of the plurality of antenna elements connected to the first splitter/combiner, and an amount of attenuation of the fixed attenuator for the antenna element arranged at an edge of an antenna is set to be larger than an amount of attenuation of the fixed attenuator for the antenna element arranged in a vicinity of a center of the antenna.

Also, in the aspect of the present invention, in the aforementioned wireless communication device, the first splitter/combiner performs 1-to-(N×M) splitting or combining for the integer M of 2 or more, a second splitter/combiner is individually connected to each of the plurality of antenna elements, and the second splitter/combiner performs 1-to-M splitting or combining, and phase shifters of M systems are connected in parallel between the second splitter/combiner and the first splitter/combiner.

Also, in the aspect of the present invention, in the aforementioned wireless communication device, a direction of a directional beam formed when one phase shifter among the phase shifters of M systems for each of the antenna elements is combined for all the antenna elements of N systems is in a vicinity of an azimuth of a target to which a directivity is to be directed and is pointing in a direction that is different from the azimuth of the target, and an average of directions of M kinds of formed directional beams is set to be a direction of the azimuth of the target to which the directivity is to be directed.

Also, in the aspect of the present invention, in the aforementioned wireless communication device, the amount of attenuation of the fixed attenuator for each of the antenna elements follows Chebyshev distribution or Taylor distribution.

Also, in the aspect of the present invention, in the aforementioned wireless communication device, an amplitude of the antenna element at a distance d from a center of the antenna is set to be proportional to $2 \times \{\cos(2\pi d\Delta\theta/\lambda)\}$ for predetermined $\Delta\theta$.

According to an aspect of the present invention, there is provided a wireless communication method performed by a wireless communication device that is a base station device or a terminal station device in a wireless communication system, the wireless communication system including the base station device having a plurality of antenna elements and a plurality of the terminal station devices, and allowing the base station device and the terminal station device to communicate with each other, the method including the step of: performing, by a high-frequency circuit, signal processing including frequency conversion between a signal in a radio frequency band and a signal in a baseband band or an intermediate frequency band; performing, by an analog signal processing circuit including a splitter/combiner and at least one phase shifter connected between the splitter/combiner and the plurality of antenna elements, gain adjustment through analog signal processing by using the phase shifter or an attenuator such that a gain for each of the plurality of antenna elements, in case of a signal transmission or in case of a signal reception, is a predetermined value being dependent on a position of the antenna element; and establishing, by the splitter/combiner, 1-to-(N×M) connection by performing splitting or combining between the high-frequency circuit and the plurality of antenna elements for an integer N of 2 or more corresponding to the number of antenna elements and an integer M of 1 or more.

Effects of the Invention

According to the present invention, it is possible to achieve a low side lobe through analog signal processing.

DESCRIPTION OF EMBODIMENTS

First, a phased array in the related art will be described so that a wireless communication device and a wireless communication method according to the present invention can be more easily described.

Figure 1:
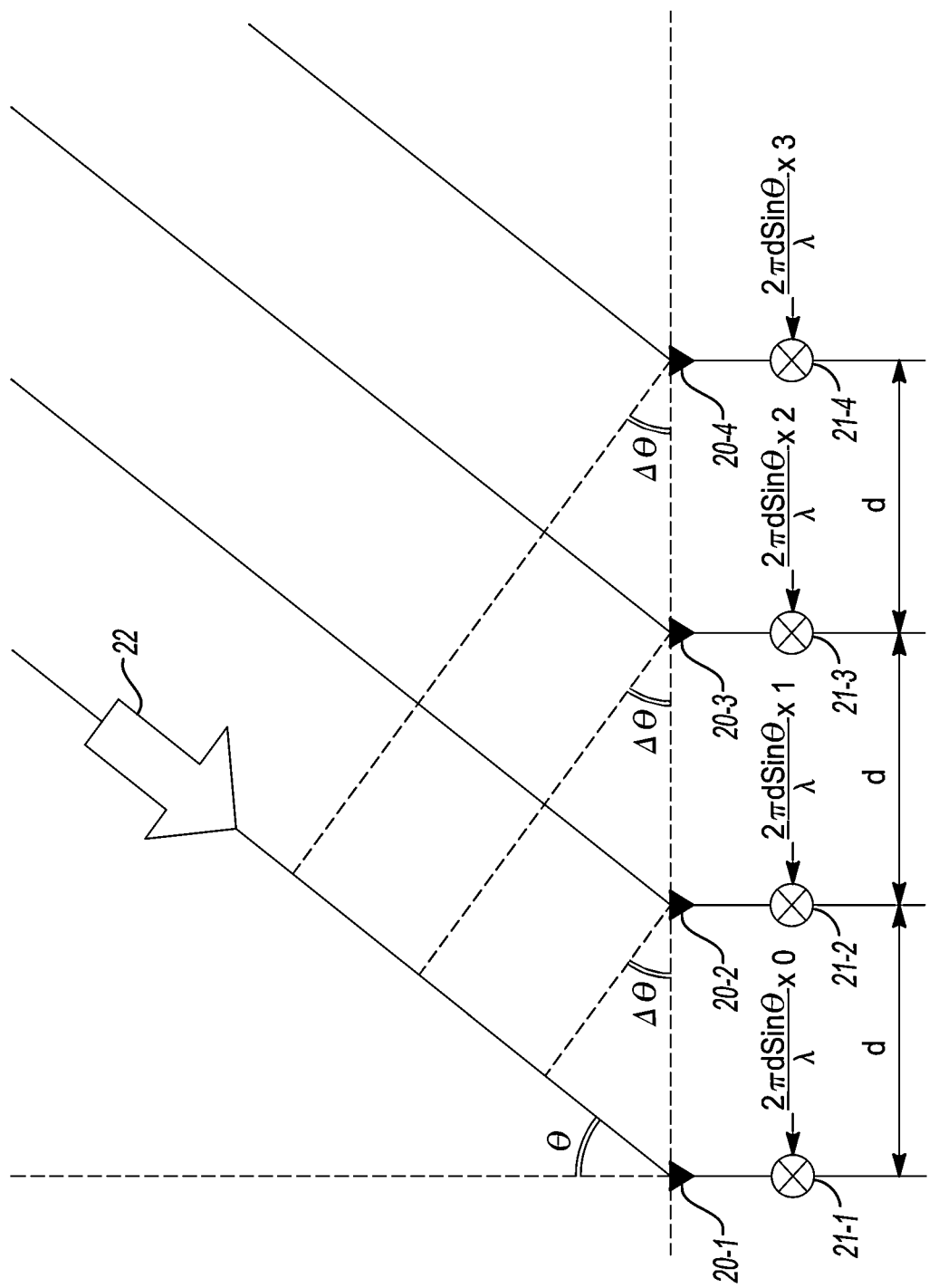
FIG. 1 is a diagram illustrating an outline of a phased array in the related art.

FIG. 1 is a diagram illustrating an outline of a phased array in the related art. In FIG. 1, reference signs 20-1 to 20-4 represent antenna elements. Reference signs 21-1 to 21-4 represent phase shifters. A reference sign 22 represents an arrow indicating an arrival direction of radio waves. Here, a case of a linear array in which the antenna elements are arranged in a one-dimensional manner at an antenna element interval d will be described for simplicity of description.

In a case in which radio waves from the arrival direction 22 (incident angle θ) are received by the antenna elements 20-1 to 20-4, a path length difference of d Sin θ is present between the antenna elements if plane wave approximation is performed on the assumption of a line-of-sight environment. Note that the path lengths decrease as the numbers of suffixes ("1" to "4") of the reference signs for the antenna elements 20-1 to 20-4 increase as illustrated in FIG. 1.

Here, if the wavelength of the arriving wave is defined as λ, complex phase rotation of −2π×d Sin θ/λ is caused between the antenna elements due to the aforementioned path length difference. If the antenna element 20-1 is considered as a reference, for example, a complex phase difference of −2π×d Sin θ/λ×1 is generated in the antenna element 20-2, a complex phase difference of −2π×d Sin θ/λ×2 is generated in the antenna element 20-3, . . . , and a complex phase difference of −2π×d Sin θ/λ×(k−1) is generated in the antenna element 20-k.

To receive all these arriving waves in the same phase, it is necessary to cancel the aforementioned complex phase differences. To cancel the aforementioned complex phase differences, it is only necessary to give complex phase rotation 2π×d Sin θ/λ×0 to a signal received by the antenna element 20-1, complex phase rotation of 2π×d Sin θ/λ×1 to a signal received by the antenna element 20-2, complex phase rotation of 2π×d Sin θ/λ×2 to a signal received by the antenna element 20-3, . . . , and complex phase rotation 2π×d Sin θ/λ×(k−1) to a signal received by the antenna element 20-k.

In general, such complex phase rotation can be provided by using a phase shifter of an analog circuit. Thus, it is possible to enhance a directional gain in the arrival direction 22 by combining outputs from the phase shifters 21-1 to 21-4 if setting of applying the aforementioned phase rotation to the phase shifters 21-1 to 21-4 is performed. If the element interval d and the arrival direction are known in advance, it is possible to stably obtain the directional gain in the arrival direction by setting these values in advance.

Here, as methods of implementing complex phase rotation of signals transmitted and received in a phased array, there are a method of performing phase rotation as analog signal processing by using phase shifters, a method of performing phase rotation by multiplying sampled digital signals represented as complex numbers by a predetermined coefficient that is a complex number, and the like. Although it is typically necessary to provide an A/D converter and a D/A converter for each antenna element for digital signal processing, there is a trend to avoid these devices in Massive MIMO of a super-large number of elements due to its high power consumption and great cost.

Figure 2:
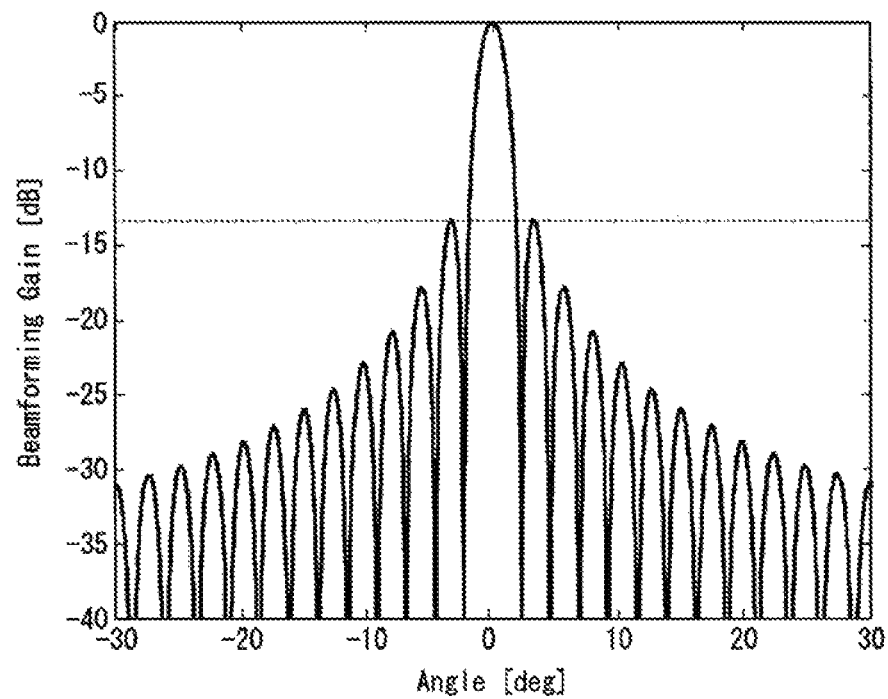
FIG. 2 is a diagram illustrating directional gain characteristics in a case in which signals of all antenna elements are simply combined.

Next, one example of a directional gain pattern formed by such a phased array is illustrated in FIG. 2. Here, a one-dimensional linear array is assumed, and fifty elements are linearly arranged at an interval of ½ wavelength for simplicity of description. A simplest example of directional beam formation is a configuration in which a directional gain is secured in a front direction, and FIG. 2 is a diagram illustrating directional gain characteristics in a case in which signals from all antenna elements are simply combined (in other words, all the antenna elements have a weight of 1 or a phase rotation of zero degrees).

Here, a high-gain region in a zero-degree direction is called a main lobe. In the main lobe, even if there is an error in an azimuth of a wireless station that is a target, it is possible to secure a relatively high directional gain as long as the error is within a predetermined angular width (in a direction in the vicinity of the azimuth of the target). On the other hand, second peaks in the directions of the angles ±3.3 degrees and the subsequent peaks are called side lobes. The side lobes are regions in which relatively higher directional gains than others are obtained even though the side lobes originally are deviated from the main lobe and are in directions in which the directional gains should not be secured.

It is known that in a case of a typical phased array antenna, a side lobe level thereof is about −13 dB with respect to the main lobe. Thus, the side lobe level may cause mutual interference, which is weak but cannot be ignored, with wireless station devices other than the target.

Next, there is a MIMO transmission technology as a technology achieved by developing such a transmission technology by using multiple antennas. According to the MIMO transmission technology, it is possible to construct a wireless communication system that includes a base station device, which includes a plurality of antenna elements, and a plurality of terminal station devices and enables the base station device and the terminal station device to perform spatial multiplexing transmission on the same frequency at the same time. In the MIMO transmission technology, it is possible to perform more efficient transmission by understanding transmission path information between transmission station and reception station.

Figure 3:
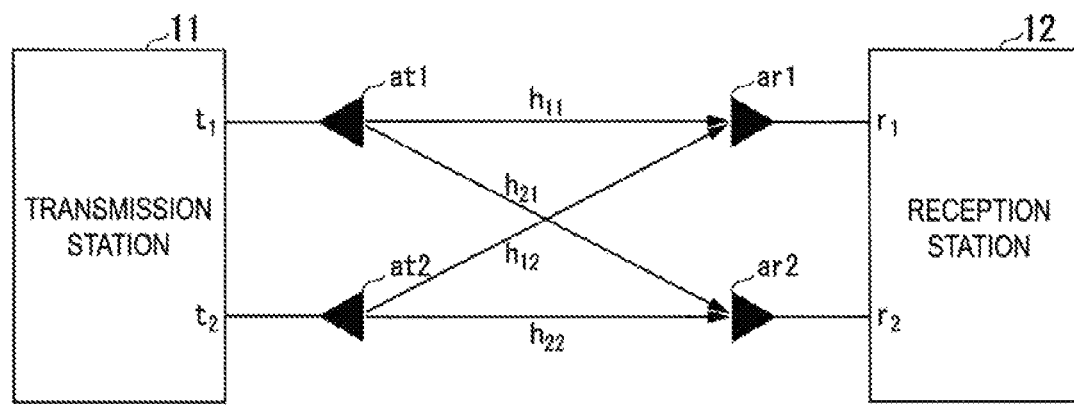
FIG. 3 is a diagram illustrating an outline of MIMO transmission.

FIG. 3 is a diagram illustrating an outline of MIMO transmission. Here, suffixes or the like representing subcarriers or frequency components are omitted as a description focusing on a certain frequency component. In FIG. 3, the reference sign 11 represents a transmission station, and a reference sign 12 represents a reception station. In the configuration example illustrated in FIG. 3, the transmission station 11 and the reception station 12 each include two antenna elements.

In a case in which channel information (information representing an amplitude and an amount of rotation of complex phases) between a transmission antenna at1 of the transmission station 11 and a reception antenna ar1 of the reception station 12 is defined as h11, channel information between the transmission antenna at1 of the transmission station 11 and a reception antenna ar2 of the reception station 12 is defined as h21, channel information between a transmission antenna at2 of the transmission station 11 and the reception antenna ar1 of the reception station 12 is defined as h12, and channel information between the transmission antenna at2 of the transmission station 11 and the reception antenna ar2 of the reception station 12 is defined as h22, a relationship between signals t1 and t2 transmitted from the two transmission antennas of the transmission station 11 and signals r1 and r2 received by the two reception antennas of the reception station 12 is represented by the mathematical relationship (1) below by using noise signals n1 and n2.

[Math. 1]

$$\begin{pmatrix} r_1 \\ r_2 \end{pmatrix} = \begin{pmatrix} h_{11} & h_{12} \\ h_{21} & h_{22} \end{pmatrix} \begin{pmatrix} t_1 \\ t_2 \end{pmatrix} + \begin{pmatrix} n_1 \\ n_2 \end{pmatrix} \quad (1)$$

Basically in the MIMO transmission, signals on the transmission side are estimated on the basis of reception signals on the reception side and a channel matrix. If a noise term in the mathematical relationship (1) is sufficiently small, it is possible to estimate a transmission signal from a reception signal by multiplying both sides by an inverse matrix of the channel matrix as represented by the mathematical relationship (2) below.

[Math. 2]

$$\begin{pmatrix} h_{11} & h_{12} \\ h_{21} & h_{22} \end{pmatrix}^{-1} \begin{pmatrix} r_1 \\ r_2 \end{pmatrix} = \quad (2)$$

$$\begin{pmatrix} h_{11} & h_{12} \\ h_{21} & h_{22} \end{pmatrix}^{-1} \begin{pmatrix} h_{11} & h_{12} \\ h_{21} & h_{22} \end{pmatrix} \begin{pmatrix} t_1 \\ t_2 \end{pmatrix} + \begin{pmatrix} h_{11} & h_{12} \\ h_{21} & h_{22} \end{pmatrix}^{-1} \begin{pmatrix} n_1 \\ n_2 \end{pmatrix}$$

$$\therefore \begin{pmatrix} t_1 \\ t_2 \end{pmatrix} = \begin{pmatrix} h_{11} & h_{12} \\ h_{21} & h_{22} \end{pmatrix}^{-1} \begin{pmatrix} r_1 \\ r_2 \end{pmatrix} - \begin{pmatrix} h_{11} & h_{12} \\ h_{21} & h_{22} \end{pmatrix}^{-1} \begin{pmatrix} n_1 \\ n_2 \end{pmatrix}$$

A relatively low noise level and a correlation between reception antennas, which is small to some extent, are typically assumed. As a result, it is possible to estimate a transmission signal by using the inverse matrix or the like of the channel matrix and to perform signal detection as long as a gap between a maximum value and a minimum value of absolute values of a plurality of eigenvalues of the channel matrix is limited.

This computation processing can also be said to correspond to solving of simultaneous equation of the mathematical relationship (1). In a physical sense, a signal transmitted by the transmission antenna at2 and received by the reception antenna ar1 is predicted on the basis of the signal transmitted by the transmission antenna at2 and received by the reception antenna ar2. By substituting this predicted value to cancel an interference signal, the signal transmitted by the transmission antenna at1 and received by the reception antenna ar1 is detected.

Next, a Massive MIMO technology including a plurality of array antennas illustrated in FIG. 1 will be described.

Figure 4:
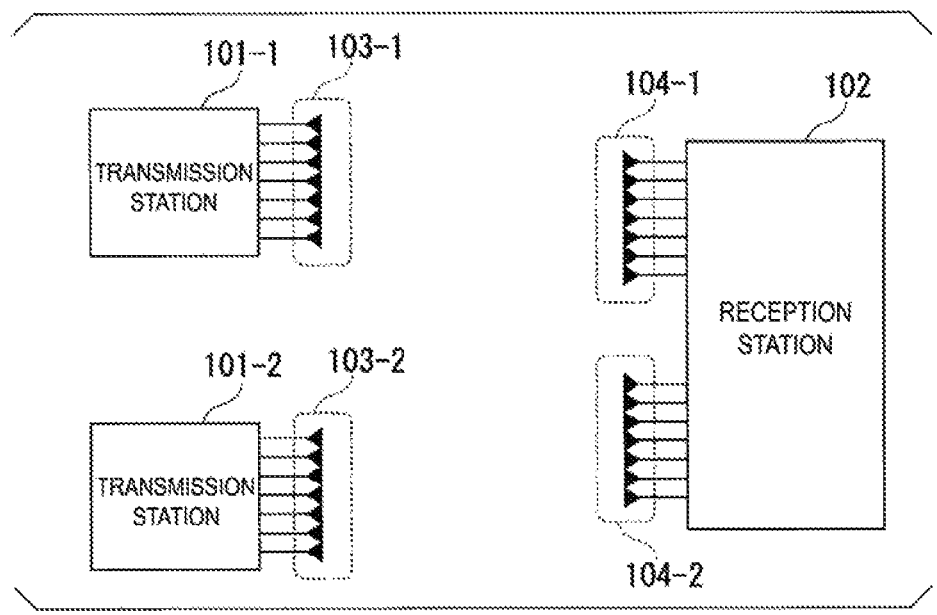
FIG. 4 is a diagram illustrating an outline of a Massive MIMO technology in the related art.

FIG. 4 is a diagram illustrating an outline of the Massive MIMO technology in the related art. In FIG. 4, the reference sign 101-1 represents a first transmission station. The reference sign 101-2 represents a second transmission station. The reference sign 102 represents a reception station. The reference signs 103-1 and 103-2 represent array antennas included in the transmission stations. The reference signs 104-1 and 104-2 represent subarrays included in the reception station.

The wireless communication system illustrated in FIG. 4 includes a plurality of terminal station devices and a base station device including a plurality of antenna elements. Although it is possible to perform bi-directional communication in the wireless communication system, here, for simplicity of description, an exemplary situation of signal transmission from two terminal station devices to one base station device will be described as communication between the two transmission stations 101-1 and 101-2 and the reception station 102. It is also possible to implement an operation in which the transmission and the reception are reversed, by performing similar processing on the transmission side as well.

First, the transmission stations 101-1 and 101-2 control array antennas 103-1 and 103-2, respectively, and form directional beams directed to the subarrays 104-1 and 104-2 in the reception station, respectively. Similarly, the reception station 102 controls the subarrays 104-1 and 104-2 and causes the subarray 104-1 to form directivity directed to the transmission station 101-1 and causes the subarray 104-2 to form directivity directed to the transmission station 101-2 similar to FIG. 1.

If the directional beams are used, a directional gain of the subarray 104-1 with respect to a signal from the transmission station 101-2 decreases, and an interference signal is received in a relatively suppressed state, in a case in which azimuths of the transmission station 101-1 and the transmission station 101-2 are different from each other. Similarly, a directional gain of the subarray 104-2 with respect to a signal from the transmission station 101-1 decreases, and an interference signal is received in a relatively suppressed state. Thus, although a substantially satisfactory Signal to Interference Ratio (SIR) is achieved merely with the directional beams, it is possible to perform interference separation processing through digital processing in order to further suppress an interference component that still cannot completely be removed.

In the processing in this case, it is possible to consider a signal after combination of the subarrays as simple 2×2 MIMO signal processing if the subarrays 104-1 and 104-2 are considered as simple reception antennas. In this manner, it is possible to simply perform signal separation through digital processing as long as it is possible to acquire channel information of a 2×2 matrix by some method.

Figure 5:
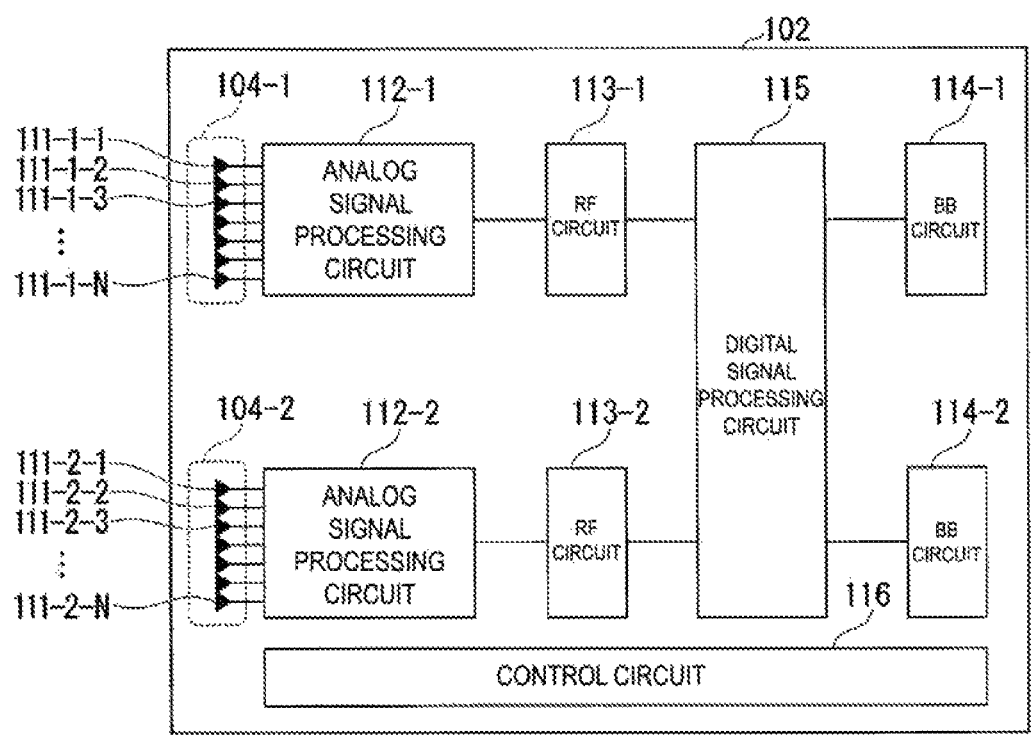
FIG. 5 is a block diagram illustrating a configuration of a wireless station device in the related art.

FIG. 5 is a block diagram illustrating a configuration of a wireless station device in the related art. In FIG. 5, the reference sign 102 represents a reception station. The reference signs 104-1 and 104-2 represent subarrays (antennas). The reference signs 111-1-1 to 111-1-N and the reference signs 111-2-1 to 111-2-N each represent antenna elements. The reference signs 112-1 and 112-2 represent analog signal processing circuits. The reference signs 113-1 and 113-2 represent RF circuits (high-frequency circuits). The reference signs 114-1 and 114-2 represent baseband signal processing circuits (BB circuits). The reference sign 115 represents a digital signal processing circuit. The reference sign 116 represents a control circuit.

Because symmetric signal processing is performed in both signal transmission and reception directions in this configuration, processing performed when a signal is received will mainly be described here. The subarrays 104-1 and 104-2 includes N antenna elements 111-1-1 to 111-1-N and 111-2-1 to 111-2-N mounted thereon, respectively. Focusing on one subarray 104-1, the antenna elements 111-1-1 to 111-1-N are connected to the analog signal processing circuit 112-1. A phase shifter is arranged for each of the antenna elements 111-1-1 to 111-1-N in the analog signal processing circuit 112-1, and it is possible to individually perform complex phase rotation in a radio frequency band for each antenna element.

Here, directivity formation is performed by the method described in FIG. 1, for example. In the analog signal processing circuit 112-1, signals on which complex phase rotation has been performed are combined by a splitter/combiner and are then integrated into one signal. Signals integrated by the analog signal processing circuits 112-1 and 112-2 undergo frequency conversion between a radio frequency and a baseband band or an intermediate frequency band by the RF circuits 113-1 and 113-2 and are then input to the digital signal processing circuit 115.

Although the signals from the transmission stations to which the subarrays 104-1 and 104-2 correspond are substantially separated by the directivity formed by the subarrays 104-1 and 104-2, slight crosstalk components remain. The digital signal processing circuit 115 suppresses these crosstalk components and performs signal separation with high precision.

The signal processing performed by the digital signal processing circuit 115 may be performed for each frequency component in a frequency domain or may be performed in a time domain. Signals with the crosstalk components suppressed through the signal processing can be handled as signals that are similar to those in a case in which one-to-one communication is performed with each transmission station. In this manner, the baseband signal processing circuits 114-1 and 114-2 perform signal detection processing by using functions similar to those in ordinary one-to-one communication and detect signals transmitted by the transmission stations.

In relation to transmission signal processing in the opposite direction, the digital signal processing circuit 115 performs signal processing for suppressing interference components in the air on signals generated by the baseband signal processing circuits 114-1 and 114-2. The signals that have undergone the signal processing are input to the RF circuits 113-1 and 113-2. The RF circuits 113-1 and 113-2 perform frequency conversion between a baseband band and radio frequency on the input signals, and the signals are input to the analog signal processing circuits 112-1 and 112-2.

Focusing on one analog signal processing circuit 112-1, the input signal is split to signals of N systems by a splitter/combiner, and the individual phase shifters perform complex phase rotation thereon. These signals are transmitted from the antenna elements 111-1-1 to 111-1-N of the subarrays 104-1 connected to the analog signal processing circuit 112-1. The transmitted signal may stably communicate with a reception station in a directivity direction formed in the analog signal processing circuit 112-1.

The signal processing performed by the digital signal processing circuit 115 may be signal processing that is basically similar to the mathematical relationship (2). However, it is also possible to use other types of signal processing. Also, phase information provided by the analog signal processing circuits 112-1 and 112-2 to the phase shifters is managed by the control circuit 116. The control circuit 116 acquires the phase information for directing the directivity in such a direction that a maximum directional gain can be obtained by some method performed in advance and then performs control.

Figure 6:
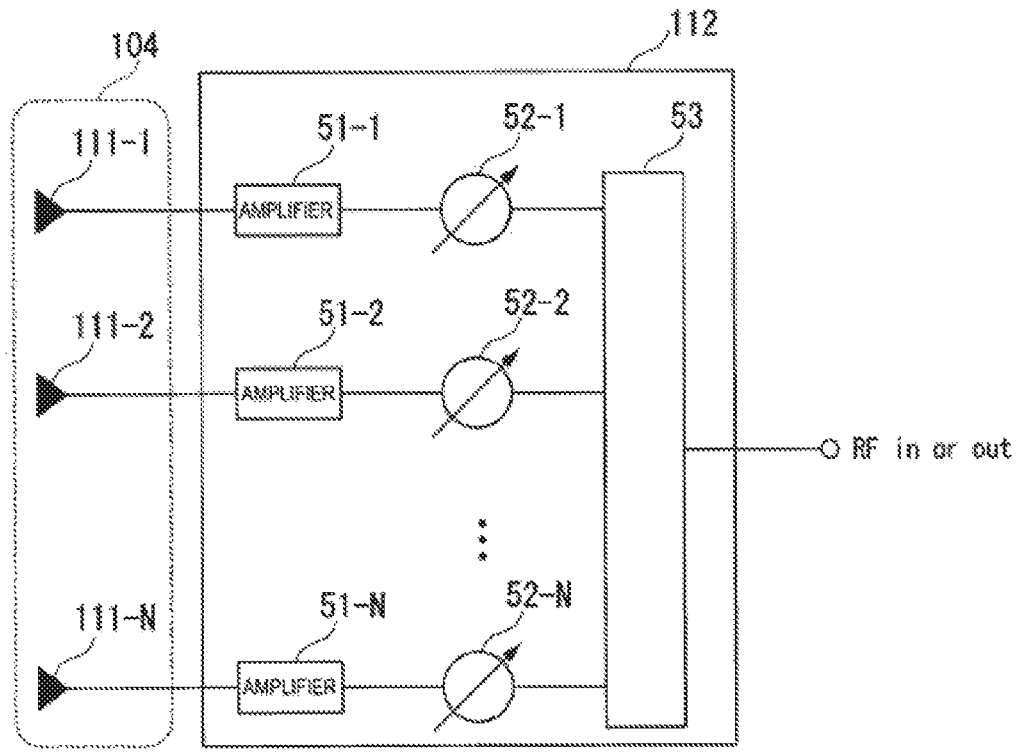
FIG. 6 is a diagram illustrating a configuration of an analog signal processing circuit in the related art.

FIG. 6 is a diagram illustrating a configuration of an analog signal processing circuit in the related art. In FIG. 6, the reference sign 51 (51-1, 51-2, . . . , 51-N) represents an amplifier (corresponding to a high-power amplifier in a transmission system and a low-noise amplifier in a reception system). The reference sign 52 (52-1, 52-2, . . . , 52-N) represents a phase shifter. The reference sign 53 represents a splitter/combiner.

The reference sign 111 ((111-1, 111-2, . . . , 111-N)) represents an antenna element. The reference sign 104 represents a subarray (antenna). The reference sign 112 represents an analog signal processing circuit. Because processing of each antenna element is the same, the following description will be given with suffixes of each system omitted.

First, if the antenna element 111 receives a signal, the amplifier 51 amplifies the signal, as processing at the time of reception. The amplified signal undergoes predetermined phase rotation by the phase shifter 52 and is then combined and output by the splitter/combiner 53. For the signal, the amount of phase rotation is determined through phased array-type processing in FIG. 1 such that the signal from each antenna element 111 is combined substantially in the same phase, and the control circuit 116 in FIG. 5 provides an instruction. Note that the output signal is output to the RF circuit 113 in FIG. 5.

On the other hand, the signal input from the RF circuit 113 in FIG. 5 is split by the splitter/combiner 53 as processing at the time of transmission. The split signals undergo predetermined complex phase rotation by each phase shifter 52, are amplified by the amplifier 51, and are then transmitted by the antenna element 111. For the signal transmitted by the antenna element, the amount of phase rotation is determined through the phased array-type processing in FIG. 1 such that substantially the same phase combination is achieved in an antenna element that is a counterpart station of communication, and the control circuit 116 in FIG. 5 provides an instruction.

First Embodiment

Hereinafter, a first embodiment of the present invention will be described in detail with reference to drawings.

Figure 7:
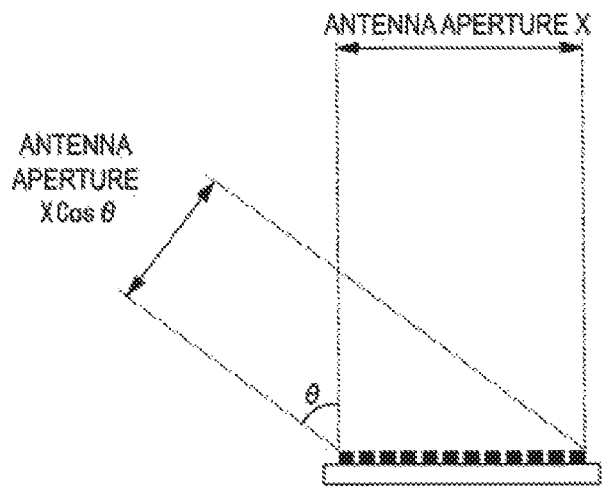
FIG. 7 is a diagram illustrating a relationship between an angle of a directional beam and an antenna aperture.

Originally, amplitudes to be provided to an antenna elements are preferably adjusted to different values each time a directivity is formed as described above, in order to achieve low side lobes. Even if an antenna aperture of the transmission station device is X as illustrated in FIG. 7, for example, the antenna aperture is seen with shrinkage of Cos θ times as compared with that in the front direction in a case in which a directional beam is directed in the direction of an angle θ from the front.

According to the technology described in NPL 1, an absolute value (corresponding to the amplitude) of a coefficient to be multiplied for each antenna element is variable in consideration of a change in antenna aperture length as well, but the shrinkage of the antenna aperture becomes significant only in a case in which θ is wide. Thus, in a case in which a service is provided with a direction substantially limited to the front direction, setting of an amplitude value (the amplitude decreases at a predetermined proportion as the antenna element is located further away) with respect to the distance from the center of the array antenna in a case in which the directional beam is directed in the front direction is implemented by using a fixed attenuator.

Figure 8:
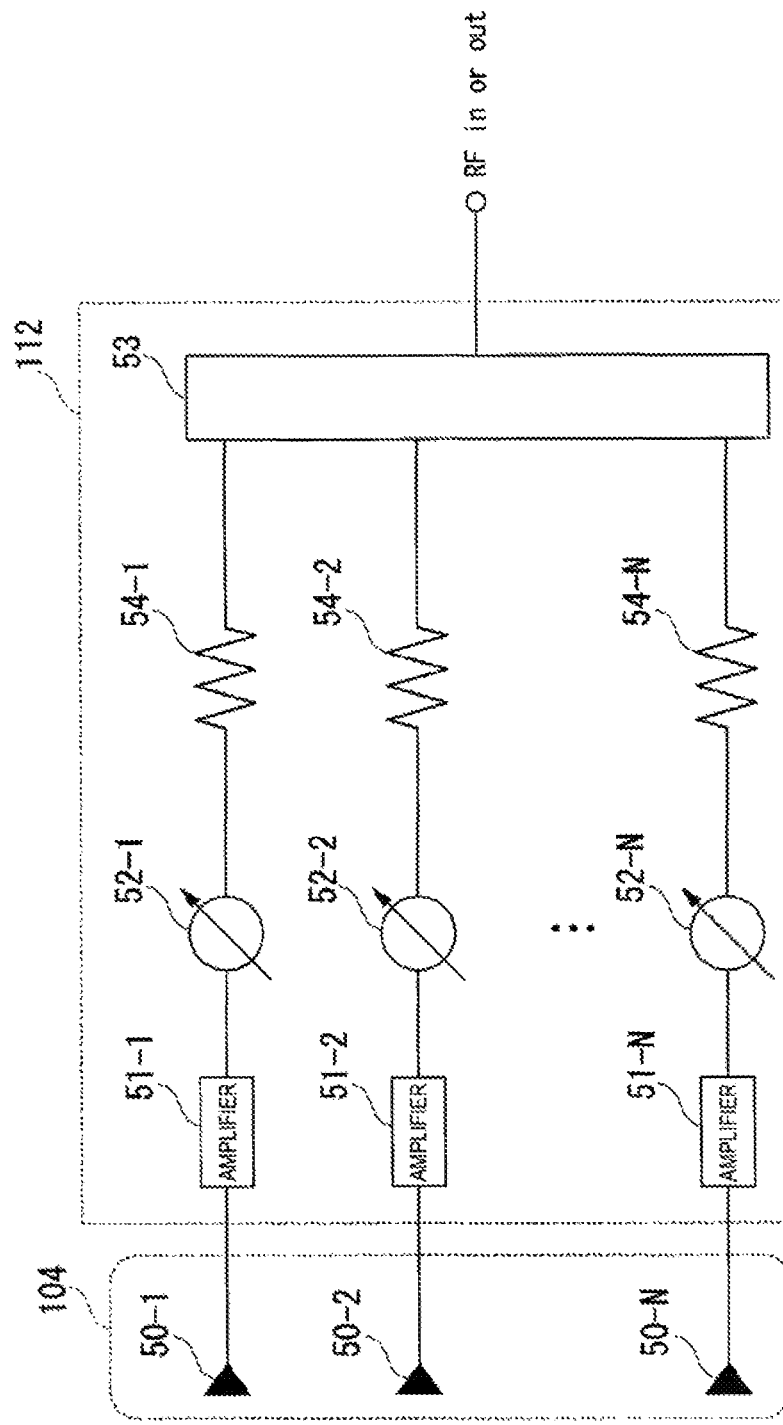
FIG. 8 is a diagram illustrating a configuration of an array antenna device according to a first embodiment of the present invention.

FIG. 8 is a diagram illustrating a configuration of an array antenna device according to the first embodiment of the present invention. In FIG. 8, the reference sign 50 (50-1, 50-2, . . . , 50-N) represents an antenna element. Here, N is an integer of 2 or greater. The reference sign 51 (51-1, 51-2, . . . , 51-N) represents an amplifier. The reference sign 52 (52-1, 52-2, . . . , 52-N) represents a phase shifter. The reference sign 53 represents a splitter/combiner (first splitter/combiner). The reference sign 54 (54-1, 54-2, . . . , 54-N) represents a fixed attenuator. As illustrated in FIG. 8, the fixed attenuator 54 (54-1, 54-2, . . . , 54-N) is connected between the splitter/combiner 53 (first splitter/combiner) and the plurality of antenna elements 50 (50-1, 50-2, . . . , 50-N) connected to the splitter/combiner 53. Note that although a configuration in which the fixed attenuators 54 (54-1, 54-2, . . . , 54-N) are connected to all the antenna elements 50 (50-1, 50-2, . . . , 50-N), respectively, is illustrated as an example in FIG. 8, the configuration is not limited thereto. At least one fixed attenuator 54 is connected between the splitter/combiner 53 and at least one of the plurality of antenna elements 50 (50-1, 50-2, . . . , 50-N) connected to the splitter/combiner 53. Specifically, because the amount of attenuation for the antenna elements near the center of the array antenna may be zero, it is not necessary to arrange fixed attenuators for such elements. In this sense, it is not always necessary to connect the fixed attenuators to all the antenna elements, and a configuration in which the fixed attenuators are connected to some of antenna elements out of all the antenna elements may be employed.

Note that the area with the reference sign 104 surrounded by the dashed line is a part corresponding to a subarray 104 in the related art. Also, the area with the reference sign 112 surrounded by the dashed line is a part corresponding to an analog signal processing circuit 112 in the related art. Similarly to the above, although each system for each antenna element could be described with suffix, the following description will be given with the suffixes omitted because processing to be performed is the same.

First, if an antenna element 50 receives a signal, then the analog signal processing circuit 112 amplifies the signal by using the amplifier 51, performs predetermined phase rotation on the amplified signal by using the phase shifter 52, and attenuates the amplitude to a predetermined level by using the fixed attenuator 54, as processing at the time of reception. The analog signal processing circuit 112 combines and outputs the signal by using the splitter/combiner 53.

For the signal, the amount of phase rotation is adjusted through phased array processing in FIG. 1 such that the signal from each antenna element 50 is combined substantially in the same phase, and the control circuit 116 in FIG. 5 provides an instruction regarding the amount of phase rotation. Note that the output signal is output to the RF circuit 113 illustrated in FIG. 5.

On the other hand, if the signal is input from the RF circuit 113 in FIG. 5, then the analog signal processing circuit 112 splits the signal by using the splitter/combiner 53, causes the fixed attenuator 54 to attenuate the amplitudes of the split signals to a predetermined level, and performs predetermined complex phase rotation thereon by using the phase shifter 52, as processing at the time of transmission. The analog signal processing circuit 112 amplifies the signal by using the amplifier 51 and then transmits the signal via the antenna element 50. For the signal transmitted by the antenna element, the amount of phase rotation is adjusted through the phased array processing in FIG. 1 such that substantially the same phase combination is achieved in the antenna element that is a counterpart station of communication, and the control circuit 116 in FIG. 5 provides an instruction regarding the amount of phase rotation.

As described in NPL 1, each aforementioned amount of attenuation of the fixed attenuator 54 is set to 0 dB for the antenna element at the center (or in the vicinity of the center) of the antennas (the fixed attenuator is omitted in practice), and is set on the basis of Chebyshev distribution or Taylor distribution or the amount of attenuation or the like obtained through combination of a plurality of beams described in a second embodiment, which will be described later, as the distance from the center of the antenna element increases.

The setting amount is not uniquely defined, and it is preferable that the amount of attenuation at edges be relatively reduced in a case in which it is desired to narrow the width of the main lobe. In such a case, the amount of suppressing of the side lobes is limited and may be a value determined in a design stage, such as simulation, in advance on the basis of a target value or the like of the side lobes.

Figure 9:
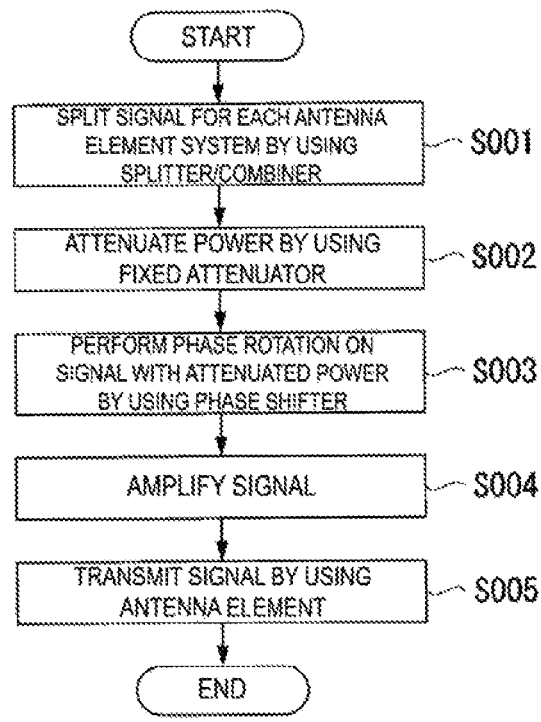
FIG. 9 is a flowchart illustrating operations of the analog signal processing circuit at the time of transmission.

Hereinafter, operations of the analog signal processing circuit 112 will be described. First, operations at the time of transmission will be described. FIG. 9 is a flowchart illustrating operations of the analog signal processing circuit 112 at the time of transmission.

If a transmission signal that is common to all systems of each antenna element 50 is input to the analog signal processing circuit 112, then the splitter/combiner 53 splits the one transmission signal for each antenna element system (Step S001) and inputs the split signals to the fixed attenuator 54. The fixed attenuator 54 attenuates power by a predetermined value (Step S002) and inputs resultant signals to the phase shifter 52. The phase shifter 52 rotates the complex phase on the basis of phase information individually set for each antenna element 50 (Step S003). The signals with the complex phases rotated by the phase shifter 52 are input to the amplifier, the signals are amplified here (Step S004), and then the antenna elements transmit the signals (Step S005).

The setting of the amount of attenuation of the fixed attenuator 54 is individually performed for the antenna elements 50. In the case of a linear array, for example, the distance from the center of the linear array is defined as a parameter, and power is attenuated in accordance with Chebyshev distribution or Taylor distribution or another predetermined amount of attenuation or the like provided in the second embodiment, which will be described later. The fixed attenuator 54 inputs a received signal with attenuated power to the phase shifter 52.

Each antenna element 50 transmits the input signal (Step S005).

Figure 10:
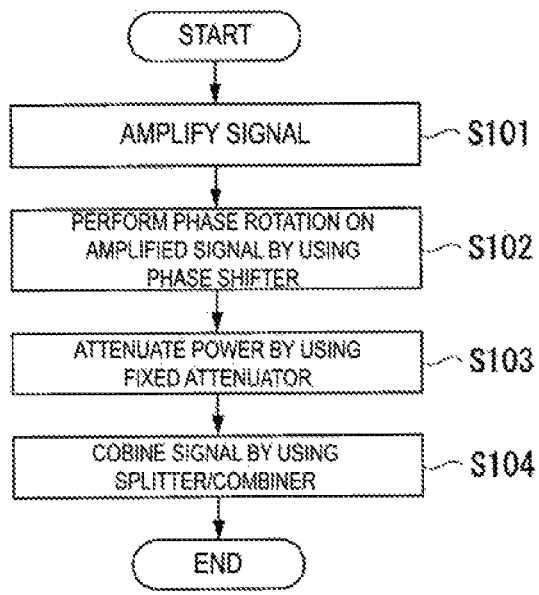
FIG. 10 is a flowchart illustrating operations of the analog signal processing circuit at the time of reception.

Next, operations at the time of reception will be described. FIG. 10 is a flowchart illustrating operations of the analog signal processing circuit 112 at the time of reception.

The signal received by each antenna element 50 is input to the amplifier 51 connected to each antenna element 50, and the signal is amplified here (Step S101).

The phase shifter 52 rotates the complex phases on the basis of phase information individually set for the antenna elements 50 (Step S102). The phase shifter 52 outputs the signals with rotated complex phases to the fixed attenuator 54, and power is attenuated by a predetermined value here (Step S103). All the signals output from the fixed attenuator 54 are combined via the splitter/combiner 53 and are then integrated into one signal. The setting of the amount of attenuation of the fixed attenuator 54 is performed individually for the antenna elements 50 as described above. In other words, transmission and reception are operated with the same amount of attenuation.

By employing the configuration described above, it is possible to achieve a directivity pattern of low side lobes, which are similar to those in digital signal processing in a pseudo manner, through analog signal processing.

Second Embodiment

Hereinafter, the second embodiment of the present invention will be described in detail with reference to drawings.

Figure 11:
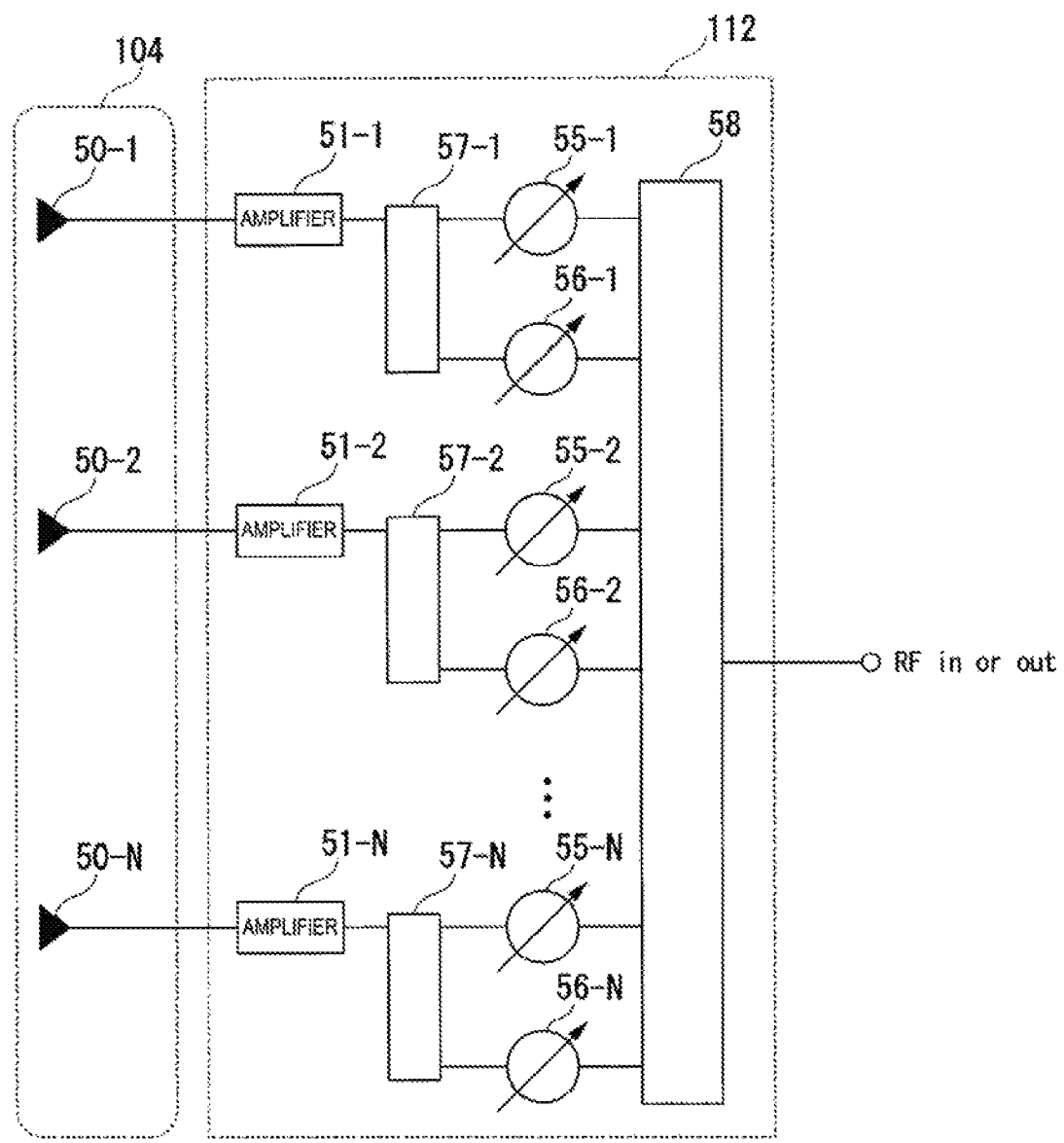
FIG. 11 is a diagram illustrating a configuration of an array antenna device according to a second embodiment of the present invention.

FIG. 11 is a diagram illustrating a configuration of an array antenna device according to the second embodiment of the present invention.

In FIG. 11, the reference sign 50 (50-1, 50-2, ..., 50-N) represents an antenna element. The reference sign 51 (51-1, 51-2, ..., 51-N) represents an amplifier. The reference sign 55 (55-1, 55-2, ..., 55-N) and the reference sign 56 (56-1, 56-2, ..., 56-N) represent phase shifters. The reference sign 57 (57-1, 57-2, ..., 57-N) represents a splitter/combiner (second splitter/combiner). The reference sign 58 represents a splitter/combiner (first splitter/combiner).

Note that the area with the reference sign 104 surrounded by the dashed line is a part corresponding to a subarray 104 in the related art. Also, the area with the reference sign 112 surrounded by the dashed line is a part corresponding to an analog signal processing circuit 112 in the related art. Similarly to the above, although each system for each antenna element could be described with suffix, the following description will be given with the suffixes omitted because processing to be performed is the same.

In the first embodiment, the fixed attenuator 54 is used to adjust amplitude information through analog processing. However, it is not easy to implement a desired amount of attenuation on a device with accuracy in design of the fixed attenuator 54. Thus, in the second embodiment, a method of adjusting amplitude information to a desired value by combining signals from two phase shifters (the phase shifter 55 and the phase shifter 56) will be described.

Note that although a configuration in which the signals from the two phase shifters (the phase shifter 55 and the phase shifter 56) are combined is employed here, a configuration in which signals from three or more phase shifters are combined may be employed. In other words, a configuration in which phase shifters of M systems (M is an integer of 2 or greater) are connected in parallel between the splitter/combiner 57 (second splitter/combiner) and the splitter/combiner 58 (first splitter/combiner) may be employed.

As illustrated in FIG. 11, pairs of two phase shifters (the phase shifter 55 and the phase shifter 56) are arranged between each antenna element 50 and an input/output port of signals in the array antenna device according to the second embodiment. Hereinafter, a case of a one-dimensional linear array will be described as an example for simplicity of description.

In a case in which a directional beam is formed in a direction of an angle $\theta$ from the front of the linear array, a path length difference generated between adjacent antenna elements with respect to an arriving plane wave is $d \sin \theta$ as described above. In this manner, it is possible to implement directivity formation in the direction of $\theta$ by performing phase rotation of $2\pi \times d \sin \theta / \lambda$ by using the phase shifter 52 in the array antenna device in the first embodiment.

In contrast, in the array antenna device according to the second embodiment, for the angle $\Delta\theta$ defined in advance, of the two groups of phase shifters (the phase shifter 55 and the phase shifter 56), one phase shifter (for example, the phase shifter 55) forms directivity in the direction of $\theta+\Delta\theta$ and the other phase shifter (for example, the phase shifter 56) forms directivity in the direction of $\theta-\Delta\theta$.

In other words, setting is performed such that a direction of a directional beam formed when one phase shifter (here, the phase shifter 55 or the phase shifter 56) out of phase shifters (here, the phase shifter 55 and the phase shifter 56) of M systems (here, M=2) for each antenna element 50 (50-1, 50-2, ..., 50-N) of all the antenna elements 50 of N systems (50-1, 50-2, ..., 50-N) are combined is set to a direction in the vicinity of a target that is different from an azimuth of the target to which the directivity is to be directed, and an average of directions of directional beams formed in the M kinds is set to the azimuth of the target to which the directivity is to be directed.

Directivity formation in the direction of $\theta \pm \Delta\theta$ can be implemented by performing phase rotation of $2\pi \times d \sin(\theta \pm \Delta\theta)/\lambda$ at an element that is separated from the center of the array antenna by d, by using the phase shifter 55 and the phase shifter 56. In a case in which first-order approximation based on Taylor expansion is performed on $2\pi \times d \sin(\theta \pm \Delta\theta)/\lambda$ around the angle $\theta$, the following mathematical relationship is obtained.

[Math. 3]

$$\frac{2\pi d}{\lambda} \sin(\theta \pm \Delta\theta) \approx \frac{2\pi d}{\lambda}\sin\theta \pm \frac{2\pi d}{\lambda}\cos\theta \times \Delta\theta = A \pm B\Delta\theta \quad (3)$$

$$A = \frac{2\pi d}{\lambda}\sin\theta$$

$$B = \frac{2\pi d}{\lambda}\cos\theta$$

If the phase rotation performed by the two phase shifters (the phase shifter 55 and the phase shifter 56) is regarded as a weight represented as a complex number and is then combined on the complex number by using the mathematical relationship (3), the following mathematical relationship is obtained.

[Math. 4]

$$e^{j(A+B\Delta\theta)} + e^{j(A-B\Delta\theta)} = e^{jA} \times \{e^{jB\Delta\theta} + e^{-jB\Delta\theta}\} = \quad (4)$$
$$e^{jA} \times \{(\cos B\Delta\theta + j\sin B\Delta\theta) + (\cos B\Delta\theta - j\sin B\Delta\theta)\} =$$
$$2\cos B\Delta\theta \times e^{jA}$$

In other words, a weight of $e^{jA}$ is multiplied when $\Delta\theta=0$, whereas a signal obtained after the signals passing through the two phase shifters (the phase shifter 55 and the phase shifter 56) are combined is attenuated in proportion to 2 Cos (B$\Delta\theta$) in relation to the amplitude while the complex phase is maintained as $e^{jA}$. Because B described here includes the antenna element interval d, an absolute value of the B value increases as the distance increases from the vicinity of the center on the assumption that the vicinity of the center of the antennas is defined as a reference. As a result, the term of 2 Cos (B$\Delta\theta$) decreases, and it is possible to further reduce the amplitude toward edges of the array antenna.

Figure 12:
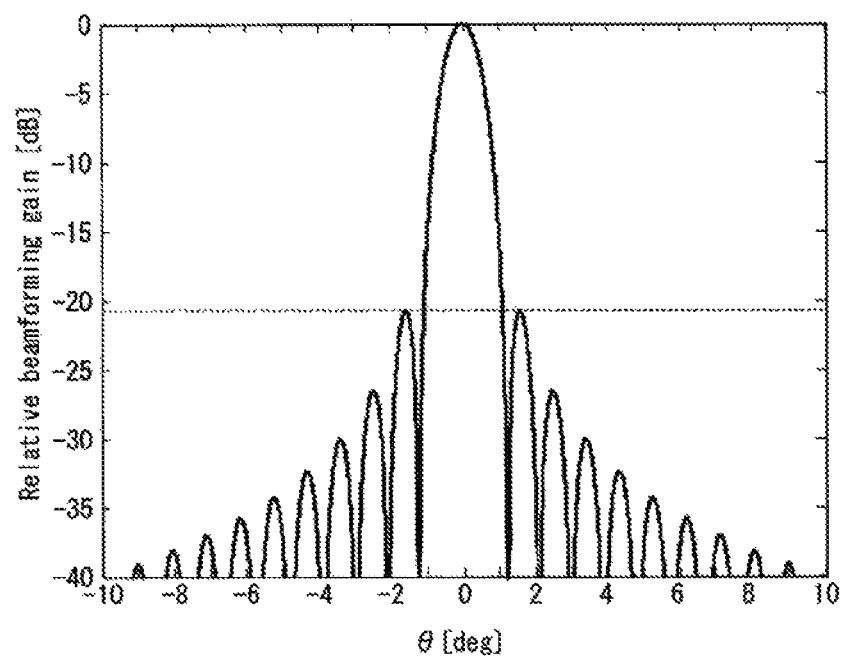
FIG. 12 is a diagram illustrating characteristics when the second embodiment of the present invention is applied.
Figure 13:
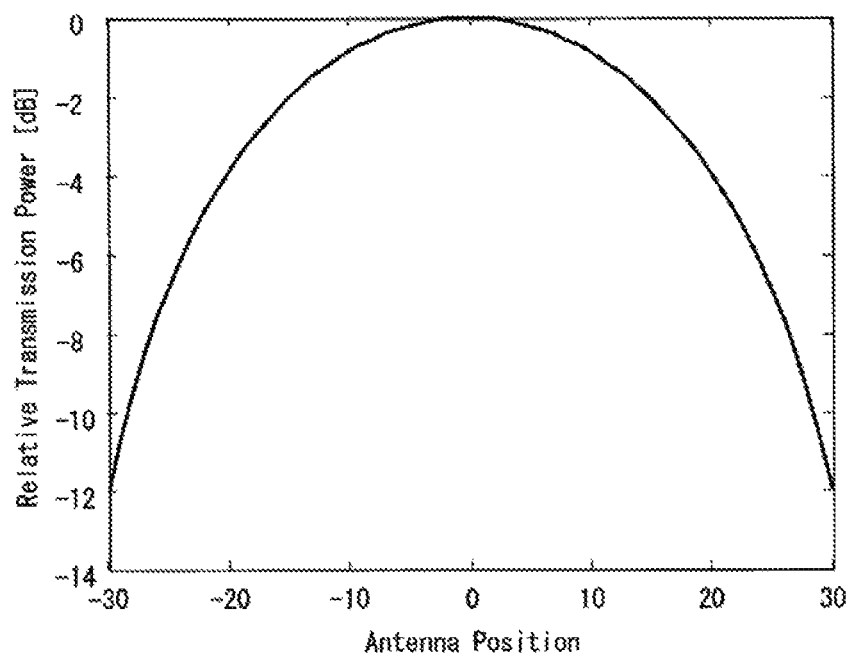
FIG. 13 is a diagram illustrating characteristics when the second embodiment of the present invention is applied.

Hereinafter, a simulation result will be described with reference to drawings. FIGS. 12 and 13 are diagrams illustrating characteristics when the second embodiment of the present invention is applied. As simulation conditions, $\theta=0$ degrees (in a state in which the directivity is directed in the front direction) and $\Delta\theta=0.5$ degrees are set in a linear array in which 51 antenna elements are aligned in a one-dimensional manner at a ½ wavelength interval.

In FIG. 12, relative gain differences with respect to a directional gain in the front direction for maximum gain are plotted in the vertical direction, and angular differences from the front direction are plotted in the horizontal direction. Also, FIG. 13 illustrates, as results of combining two analog beams, distances of antenna elements from the center of the linear array (indicates the number of the antenna element from the center) and relative power values transmitted and received from the antenna elements at that time.

As illustrated in FIG. 12, a maximum relative level of side lobes on left and right sides of the main lobe at the center is about −21 dB. It is possible to understand that the side lobe level is reduced by 8 dB and unnecessary radiation is efficiently suppressed, in consideration of the level was about −13 dB before as described above in FIG. 2.

At this time, FIG. 13 illustrates a relative power difference in signals transmitted and received by each of the antenna elements 50. Because value of B of 2 Cos (B$\Delta\theta$) in the mathematical relationship (4) increases with an increase in distance of antenna positions from the center, 2 Cos (B$\Delta\theta$) decreases, and the amplitude and the power are attenuated, as a result. As illustrated in FIG. 13, the power of the antenna elements away from the center of the antennas by about 15 or more antenna elements is equal to or less than −3 dB, and it is not possible to cause such antenna elements to effectively function to secure gains in the maximum directivity direction in terms of power. However, it is possible to understand that such antenna elements effectively contribute to reduction of the side lobes as illustrated in FIG. 12.

In this situation, the reduction of the power at the edges of the antennas is equivalent to size reduction of available antenna aperture. Thus, the beam width of the main lobe looks as if it was widened in practice, and there is thus an advantage that it is possible to reduce a gain difference to be small even if there is an angular error with respect to the maximum gain direction for the direction of the wireless station that is a counterpart of communication. On the other hand, it is possible to suppress unnecessary radiation for the other wireless station devices, which is effective for reducing a level of mutual interference that adversely affects each other in a case in which spatial multiplexing transmission is performed.

The value of $\Delta\theta$ may be set such that a desired main lobe width and side lobe level are satisfied by evaluating characteristics through simulation by using frequencies, the number of antenna elements, the antenna element interval (the antenna aperture standardized by wavelengths), an antenna layout, and the like as parameters.

Note that if $\Delta\theta$ is defined in system design performed separately, it is possible to form a desired beam by additionally mounting a value of $2\pi \times d \sin(\theta \pm \Delta\theta)/\lambda$ as a table for $\theta$ and setting the values for the individual phase shifters in each of the groups of phase shifters.

Note that although the case in which the linear array is used has been described above as an example, the directions in which the directional beams can perform scanning may be set to two-dimensional horizontal/vertical directions, such as a rectangular array.

In a case in which an azimuth to which a directional beam is to be directed is provided by a combination of an angle $\theta x$ in the horizontal direction and an angle $\theta y$ in the vertical direction, for example, and on the assumption that an antenna element interval in the horizontal direction is defined as dx and an antenna element interval in the vertical direction is defined as dy, it is only necessary to mount four groups of phase shifters performing phase rotation corresponding to $2\pi \times \{dx \sin(\theta x \pm \Delta\theta) + dy \sin(\theta y \pm \Delta\theta)/\lambda\}$ such that the directivity formation is individually performed in four directions ($\theta x+\Delta\theta$, $\theta y+\Delta\theta$), ($\theta x+\Delta\theta$, $\theta y-\Delta\theta$), ($\theta x-\Delta\theta$, $\theta y+\Delta\theta$), and ($\theta x-\Delta\theta$, $\theta y-\Delta\theta$) for ($\theta x$, $\theta y$).

Other Supplemental Description

Although the configuration in a case in which the array antenna devices are separated for transmission and reception has been described above, it is also possible to employ a configuration in which a Time Division Duplex (TDD)-SW is mounted and a high-power amplifier and a low-noise amplifier are arranged at positions that are further from the antenna than the TDD-SW. In this case, it is also possible to employ a configuration in which the amplifier 51 in FIGS. 8 and 11 are deleted from the drawings and the amplifier is mounted in the RF circuit 113 in FIG. 5.

In addition, the value of the amount of attenuation for each antenna element 50 in the first embodiment of the present invention can be set to the value on the basis of the Taylor distribution and the Chebyshev distribution in NPL 1, or the value obtained by associating the amount of attenuation, indicated in FIG. 13 described above, with the antenna position. In this case, the amount of attenuation is inherently dependent on the direction $\theta$ in which the directivity is directed, but the attenuator value needs to be fixed, so the value of $\theta=0$ degrees is substituted. In that case, B of 2 Cos (B$\Delta\theta$) in the mathematical relationship (4) can be replaced with $2\pi d/\lambda$ and rewritten as 2 Cos ($2\pi d\Delta\theta/\lambda$).

Accordingly, the design may be performed such that the amplitude of the antenna element where the distance from the center of the antenna is d is proportional to 2 Cos ($2\pi d\Delta\theta/\lambda$) for a given $\Delta\theta$. However, in the case of a two-dimensional planar antenna, if the distance in the horizontal direction is dx and the distance in the vertical direction is dy with respect to the center portion of the array antenna, it is also possible to define 4 Cos ($2\pi dx\Delta\theta/\lambda$)×Cos ($2\pi dy\Delta\theta/\lambda$) as the multiplication product of the respective amount of attenuation.

Further, the present invention is applicable to system that forms a fixed directivity, or in a case in which a directivity is adaptively formed in any direction. Adaptive directivity formation can be effectuated by setting a phase rotation to each phase shifter in order to form the directivity acquired by implementing any directivity determination means used in other common systems to the direction corresponding to ($\theta x \pm \Delta\theta$, $\theta y \pm \Delta\theta$) relative to the direction of the target to be directed.

In the above description, a case in which a linear array or rectangular array is used has been described as an example, but the antenna of other configurations can also be accommodated. As a typical example, although the number of phase shifter groups has also been described as two in the linear (one-dimensional) array and four in the rectangular (or two-dimensional) array, the number of phase shifter groups can be set to three even for the linear array or three or less for the rectangular array, or can be set other numbers.

Hereinabove, the embodiment of the present invention has been described. Conventionally in Massive MIMO, control technologies such as digital signal processing and combinations of phase shifters that are analog circuits and digital signal processing have been proposed as technologies for suppressing side lobes, there has been a problem that cost and power consumption increase due to utilization of the A/D converter and the D/A converter for performing the digital signal processing. In contrast, according to a technology according to the embodiment of the present invention, phases and amplitudes of input/output signals can be generated in desired distribution for each antenna element by using the attenuator or the plurality of phase shifters. This enables the formation of a directional beam that reduces side lobes according to the technology according to the embodiment of the present invention.

The embodiments of the present invention have been described above with reference to the drawings, but it is clear that the above embodiments are merely exemplary of the present invention, and the present invention is not limited to the embodiments described above. Accordingly, additional, omitted, substituted, and other modifications of the components may be made without departing from the technical spirit and the scope of the present invention.

The wireless communication device according to the aforementioned embodiment may be implemented by a computer.

In such a case, the wireless communication device may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

REFERENCE SIGNS LIST

11 Transmission station
12 Reception station
20 Antenna element
21 Phase shifter
51 Amplifier
52 Phase shifter
53 Splitter/combiner
54 Fixed attenuator
55 Phase shifter
56 Phase shifter
57 Splitter/combiner
58 Splitter/combiner
101 Transmission station
102 Reception station
103 Array antenna
104 Subarray
111 Antenna element
112 Analog signal processing circuit
113 RF circuit
114 BB circuit
115 Digital signal processing circuit
116 Control circuit

The invention claimed is:

1. A wireless communication device having a plurality of antenna elements, the wireless communication device comprising:

a high-frequency circuit configured to perform signal processing including frequency conversion between a signal in a radio frequency band and a signal in a baseband band or an intermediate frequency band; and an analog signal processing circuit configured to perform gain adjustment through analog signal processing by using a phase shifter such that a gain for each of the plurality of antenna elements, in case of a signal transmission or in case of a signal reception, is a predetermined value being dependent on a position of a given antenna element, wherein the analog signal processing circuit includes a first splitter/combiner configured to establish 1-to-(N× M) connection by performing splitting or combining between the high-frequency circuit and the plurality of antenna elements for an integer N of 2 or more corresponding to a number of antenna elements and an integer M of two or more, for each antenna element in the plurality of antenna elements, a second splitter/combiner is coupled to a particular antenna element in the plurality of antenna elements and performs 1-to-M splitting or combining, and for each antenna element in the plurality of antenna elements, two or more phase shifters of a given M system connected in parallel with each other and coupled between the first splitter/combiner and a corresponding second splitter/combiner, wherein a direction of a directional beam formed when one phase shifter among the two or more phase shifters of the given M systems for each of the plurality of antenna elements is combined for all of the plurality of antenna elements in a vicinity of an azimuth of a target to which a directivity is to be directed and is pointing in a direction that is different from the azimuth of the target, and an average of directions of M kinds of formed directional beams is set to be a direction of the azimuth of the target to which the directivity is to be directed.

2. The wireless communication device according to claim 1, wherein an amplitude of the given antenna element at a distance d from a center of the given antenna is set to be proportional to $2\times\{\cos(2\pi d\Delta\theta/\lambda)\}$ for predetermined $\Delta\theta$.

* * * * *